(12) United States Patent
Kume et al.

(10) Patent No.: US 11,018,330 B2
(45) Date of Patent: May 25, 2021

(54) CATHODE ACTIVE MATERIAL CONTAINING MAGNESIUM-TRANSITION METAL COMPOSITE OXIDE AND MAGNESIUM SECONDARY BATTERY USING THE SAME

(71) Applicant: Panasonic Intellectual Property Management Co., Ltd., Osaka (JP)

(72) Inventors: Toshiro Kume, Hyogo (JP); Go Tei, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 125 days.

(21) Appl. No.: 16/273,163

(22) Filed: Feb. 12, 2019

(65) Prior Publication Data

US 2019/0296326 A1 Sep. 26, 2019

(30) Foreign Application Priority Data

Mar. 22, 2018 (JP) .............................. JP2018-054013

(51) Int. Cl.
| | |
|---|---|
| *H01M 4/131* | (2010.01) |
| *H01M 4/505* | (2010.01) |
| *H01M 10/054* | (2010.01) |
| *H01M 4/525* | (2010.01) |
| *H01M 4/02* | (2006.01) |

(52) U.S. Cl.
CPC ........... *H01M 4/131* (2013.01); *H01M 4/505* (2013.01); *H01M 4/525* (2013.01); *H01M 10/054* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2013/0302697 A1* | 11/2013 | Wang | ................. H01M 10/054 429/300 |
| 2018/0183058 A1* | 6/2018 | Idemoto | ................. H01M 4/525 |

FOREIGN PATENT DOCUMENTS

| | | |
|---|---|---|
| JP | 2018-163800 | 10/2018 |
| WO | 2016/143675 | 9/2016 |
| WO | 2016/199732 | 12/2016 |

* cited by examiner

*Primary Examiner* — Laura Weiner
(74) *Attorney, Agent, or Firm* — McDermott Will and Emery LLP

(57) ABSTRACT

A cathode active material for magnesium secondary batteries contains a composite oxide represented by the formula $Mg_xM_yO_2$, where M is at least one selected from the group consisting of Ni, Co, Mn, Ti, V, Cr, Fe, Cu, and Mo; $1.0<x$, and $y<1.0$.

16 Claims, 1 Drawing Sheet

CATHODE ACTIVE MATERIAL CONTAINING MAGNESIUM-TRANSITION METAL COMPOSITE OXIDE AND MAGNESIUM SECONDARY BATTERY USING THE SAME

BACKGROUND

1. Technical Field

The present disclosure relates to a cathode active material for magnesium secondary batteries and to a secondary battery that uses this active material.

2. Description of the Related Art

In recent years, the development of magnesium secondary batteries has been expected.

Patent Application Publication No. US2018/183058 A1 discloses a cathode active material for magnesium secondary batteries. The active material is represented by the formula $Mg_xM1_yM2_zO_2$, where M1 is Ni, Co, or Mn, M2 is at least one element different from M1 and selected from the group consisting of Ni, Co, Mn, Ti, V, Cr, Fe, Cu, Nb, W, Mo, and Ru, $0<x\leq1$, $0<y<2$, and $1.5\leq x+y+z\leq2.0$.

SUMMARY

In one general aspect, the techniques disclosed here feature a cathode active material for magnesium secondary batteries. The active material contains a composite oxide represented by the composition formula $Mg_xM_yO_2$, where M is at least one selected from the group consisting of Ni, Co, Mn, Ti, V, Cr, Fe, Cu, and Mo; $1.0<x$, and $y<1.0$.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
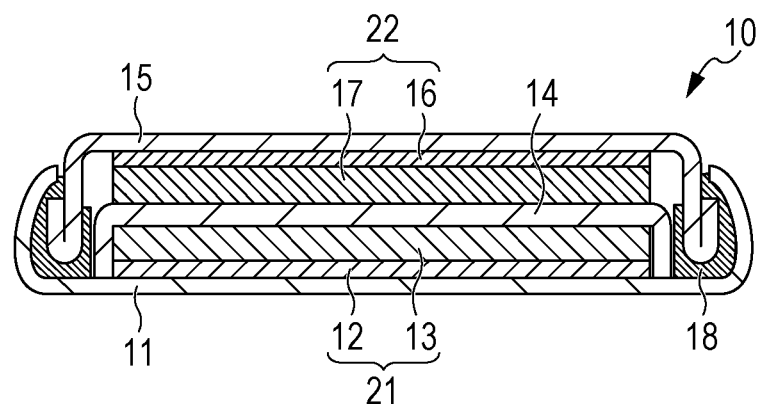
FIG. 1 is a cross-section schematically illustrating an exemplary construction of a magnesium secondary battery.

The following describes a cathode active material according to an embodiment in detail using drawings. A magnesium secondary battery that uses this active material is also described.

The following description is entirely about general or specific examples.

Information such as numerical values, compositions, shapes, thicknesses, electrical properties, and structures of secondary batteries are illustrative and not intended to limit any aspect of the disclosure, and those elements that are not recited in an independent claim, which defines the most generic concept, are optional.

1. Cathode Active Material

Magnesium secondary batteries are promising candidates for higher-capacity secondary batteries because they utilize two-electron reactions of magnesium. Divalent magnesium ions, however, strongly interact with anions (e.g., oxide ions) in the active materials. The interactions prevent smooth movement of magnesium ions inside the active materials, inhibiting the electrode reactions in the active materials.

As a solution to this, the inventors have found a novel cathode active material described below.

A cathode active material according to an embodiment contains a composite oxide represented by the composition formula $Mg_xM_yO_2$. M is at least one selected from the group consisting of Ni, Co, Mn, Ti, V, Cr, Fe, Cu, and Mo, $1.0<x$, and $y<1.0$.

The inequality $1.0<x$ means that the amount of Mg is greater than in $MgMO_2$. The inequality $y<1.0$ means that the amount of M is smaller than in $MgMO_2$.

This cathode active material exhibits a high discharge capacity, presumably through the following mechanism: The composite oxide has been designed so that it has the halite structure and contains more magnesium than in the stoichiometric composition. This statistically increases the percentage of magnesium atoms that come close to each other in the cathode active material, helping paths to be created for magnesium ions to move through. That is, this cathode active material allows for percolative conduction of magnesium ions.

x and y may satisfy $1.0<x\leq1.71$ and $0.29\leq y<1.0$, respectively. Moreover, x and y may satisfy $1.0<x\leq1.5$ and $0.5\leq y<1.0$, respectively.

x may satisfy $1.0<x\leq1.3$ or even $1.1\leq x\leq1.3$. y may satisfy $0.7\leq y<1.0$ or even $0.7\leq y<0.9$.

M may be at least one 3d transition metal selected from the group of Ni, Co, Mn, Ti, V, Cr, Fe, and Cu. M may include at least one of Co and Mn as essential element(s). M may include Mn as an essential element, or Mn may be the only M. M may include Co as an essential element, or Co may be the only M.

When a cathode active material according to this embodiment is used in a secondary battery, the valency of M is 2 before charge and discharge and when the battery is completely discharged, and can be n when the battery is completely charged. The number n corresponds to the upper limit to which the valency of M can consistently change from 2 with the charging reaction of the cathode active material. The value of n depends on the kind(s) of transition metal(s) M used, but by way of example, it may be the largest oxidation number of M. The composition of the cathode active material "before charge and discharge" is equivalent to that after production and before use in the secondary battery.

Assume that (i) M is a single transition metal and that (ii) the amount of Mg used for charge and discharge is ⅓ of that the material contains before charge and discharge. In this assumption, the upper limit of x can be expressed as $(6n-12)/(3n-4)$, and the lower limit of y as $2-(6n-12)/(3n-4)$. For example, if M is Mn, n=6; therefore, the upper limit of x is 1.71, and the lower limit of y is 0.29. For example, if M is Co for example, n=4; therefore, the upper limit of x is 1.5, and the lower limit of y is 0.5.

A cathode active material according to this embodiment may be primarily the composite oxide. The term "be primarily the composite oxide" means that the percentage by volume of the composite oxide to the cathode active material is equal to or greater than 60%.

The composite oxide may have a crystal structure that belongs to the space group Fm-3m.

2. Production of the Cathode Active Material

A cathode active material according to this embodiment is produced by, for example, mixing a raw material containing Mg and a raw material containing a transition metal M.

The Mg-containing raw material is, for example, an oxide of magnesium. Examples of oxides of magnesium include MgO and $MgO_2$.

The M-containing raw material is, for example, an oxide of the transition metal M. Examples of oxides of the transition metal M include MO, $M_3O_4$, $M_2O_3$, $MO_2$, and $M_2O_7$.

These raw materials are weighed out. The amounts of the raw materials are adjusted according to the composition of the target composite oxide.

The raw materials are then mixed, for example using a ball mill, rod mill, bead mill, or jet mill. Both dry mixing and wet mixing work well. The duration of mixing is, for example, 10 hours or more and 48 hours or less.

This gives a composite oxide containing Mg and the transition metal M. The composite oxide may undergo subsequent heat treatment.

Alternatively, the composite oxide may be synthesized by dry-mixing a raw material containing Mg and a raw material containing a transition metal M and then heating (e.g., firing) the mixture for oxidation.

The composition of the resulting composite oxide can be determined by, for example, inductively coupled plasma (ICP) emission spectrometry. The crystal structure of the composite oxide can be determined by powder X-ray analysis.

3. Magnesium Secondary Battery

3-1. Overall Construction

A cathode active material according to this embodiment can be used in a magnesium secondary battery. That is, a magnesium secondary battery includes a cathode containing a cathode active material, an anode, and an electrolyte that conducts magnesium ion. The cathode active material has a composition according to "[1. Cathode Active Material]" when the magnesium secondary battery is completely discharged.

The term "completely discharged" means that the cell of the magnesium secondary battery has released the electricity stored therein to its end-of-discharge voltage. In a completely discharged battery, magnesium ions in a quantity corresponding to the reversible capacity have all been inserted into the cathode active material. A cathode active material according to this embodiment exhibits a discharge potential versus magnesium of, for example, 1.5 to 1.7 V when the battery is completely discharged. In the present disclosure, therefore, a cathode active material can be considered completely discharged if the discharge potential of the cathode active material is equal to or smaller than 1.5 V versus magnesium.

FIG. 1 is a cross-section schematically illustrating an exemplary construction of a magnesium secondary battery 10.

The magnesium secondary battery 10 includes a cathode 21, an anode 22, a separator 14, a casing 11, a sealing plate 15, and a gasket 18. The separator 14 is between the cathode 21 and anode 22. The cathode 21, anode 22, and separator 14 have been impregnated with a nonaqueous electrolyte and are housed in the casing 11. The gasket 18 and sealing plate 15 seal the casing 11.

The structure of the magnesium secondary battery 10 may be, for example, cylindrical, square, button-shaped, coin-shaped, or flat-plate.

3-2. Cathode

The cathode 21 includes a cathode collector 12 and a cathode active material layer 13 on the cathode collector 12.

The cathode active material layer 13 contains a cathode active material according to "[1. Cathode Active Material]."

The cathode active material layer 13 may optionally contain a conductor and/or a binder.

The conductor can be, for example, a carbon material, metal, inorganic compound, or electrically conductive polymer. Examples of carbon materials include graphite, such as natural graphite (e.g., flake and vein graphite) and artificial graphite, acetylene black, carbon black, Ketjenblack, carbon whiskers, needle coke, and carbon fiber. Examples of metals include copper, nickel, aluminum, silver, and gold. Examples of inorganic compounds include tungsten carbide, titanium carbide, tantalum carbide, molybdenum carbide, titanium boride, and titanium nitride. One of these materials may be used alone, or two or more may be used as a mixture.

Examples of binders include fluoropolymers, such as polytetrafluoroethylene (PTFE), polyvinylidene fluoride (PVdF), and fluororubbers, thermoplastic resins, such as polypropylene and polyethylene, ethylene propylene diene monomer (EPDM) rubber, sulfonated EPDM rubber, and natural butyl rubber (NBR). One of these materials may be used alone, or two or more may be used as a mixture.

The cathode active material, conductor, and binder have been dispersed in a solvent, and examples of solvents include N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran. The solvent may contain, for example, a thickening agent added thereto. Examples of thickening agents include carboxymethyl cellulose and methyl cellulose.

The following is an example of the formation of the cathode active material layer 13. First, the cathode active material, a conductor, and a binder are mixed. The resulting mixture is combined with an appropriate solvent to give a cathode mixture in paste form. This cathode mixture is then applied to the surface of the cathode collector 12 and dried, forming a cathode active material layer 13 on the cathode collector 12. The cathode active material layer 13 may be compressed to increase the electrode density.

The thickness of the cathode active material layer 13 is not critical. For example, it is 1 μm or more and 100 μm or less.

The cathode collector 12 is made of, for example, metal or alloy. More specifically, the cathode collector 12 may be made of a metal selected from, or metals that include at least one selected from, the group consisting of copper, chromium, nickel, titanium, platinum, gold, aluminum, tungsten, iron, and molybdenum or an alloy that contains at least one selected from this group. The cathode collector 12 may be made of, for example, stainless steel.

In terms of shape, the cathode collector 12 may be a plate or foil. The cathode collector 12 may be a multilayer film.

If the casing 11 doubles as the cathode collector, the cathode collector 12 may be omitted.

3-3. Anode

The anode 22 includes, for example, an anode active material layer 17 containing an anode active material and an anode collector 16.

The anode active material layer 17 contains an anode active material into which magnesium ions can be inserted and from which magnesium ions can be eliminated. In this case, the anode active material can be, for example, a carbon material. Examples of carbon materials include graphite, non-graphitic carbon, such as hard carbon and coke, and graphite intercalation compounds.

The anode active material layer 17 may optionally contain a conductor and/or a binder. Examples of conductors, binders, solvents, and thickening agents that can optionally be used are the same as described in "[3-2. Cathode]."

The thickness of the anode active material layer 17 is not critical. For example, it is 1 µm or more and 50 µm or less.

Alternatively, the anode active material layer 17 contains an anode active material on which metallic magnesium can be dissolved and deposited. In this case, the anode active material can be, for example, metallic Mg and a Mg alloy. Examples of Mg alloys include alloys of magnesium with at least one selected from aluminum, silicon, gallium, zinc, tin, manganese, bismuth, and antimony.

Examples of materials that can be used to make the anode collector 16 are the same as described for the cathode collector 12 in "[3-2. Cathode]." In terms of shape, the anode collector 16 may be a plate or foil.

If the casing 11 doubles as the anode collector, the anode collector 16 may be omitted.

If the anode collector 16 is made of a material on which metallic magnesium can be dissolved and deposited, the anode active material layer 17 may be omitted. That is, an anode collector 16 on which metallic magnesium can be dissolved and deposited may be the only component of the anode 22. In this case, the anode collector 16 may be made of stainless steel, nickel, copper, or iron.

3-4. Separator

The separator 14 can be, for example, a microporous thin film, woven fabric, or nonwoven fabric. The separator 14 may be made of a polyolefin, such as polypropylene or polyethylene. The thickness of the separator 14 is, for example, from 10 to 300 µm. The separator 14 may be a single-layer film made of a single material or a composite film (or a multilayer film) composed of two or more materials. The porosity of the separator 14 is in the range of, for example 30% to 70%.

3-5. Electrolyte

The electrolyte can be any material that conducts magnesium ions.

For example, the electrolyte is a nonaqueous liquid electrolyte. The nonaqueous liquid electrolyte contains a nonaqueous solvent and a magnesium salt dissolved in the nonaqueous solvent.

The nonaqueous solvent can be, for example, a cyclic or linear ether, cyclic or linear carbonate, cyclic or linear carboxylate, pyrocarbonate, phosphate, borate, sulfate, sulfite, cyclic or linear sulfone, nitrile, or sultone.

Examples of cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineole, crown ethers, and their derivatives. Examples of linear ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, tetraethylene glycol dimethyl, and their derivatives.

Examples of cyclic carbonates include ethylene carbonate, propylene carbonate, butylene carbonate, vinylene carbonate, fluoroethylene carbonate, 4,5-difluoroethylene carbonate, 4,4,4-trifluoroethylene carbonate, fluoromethyl ethylene carbonate, trifluoromethyl ethylene carbonate, 4-fluoropropylene carbonate, 5-fluoropropylene carbonate, and their derivatives. Examples of linear carbonates include dimethyl carbonate, ethyl methyl carbonate, diethyl carbonate, methyl propyl carbonate, ethyl propyl carbonate, and methyl isopropyl carbonate, and their derivatives.

Examples of cyclic carboxylates include γ-butyrolactone, γ-valerolactone, γ-caprolactone, ε-caprolactone, α-acetolactone, and their derivatives. Examples of linear carboxylates include methyl acetate, ethyl acetate, propyl acetate, butyl acetate, methyl propionate, ethyl propionate, propyl propionate, butyl propionate, and their derivatives.

Examples of pyrocarbonates include diethyl pyrocarbonate, dimethyl pyrocarbonate, di-tert-butyl dicarbonate, and their derivatives. Examples of phosphates include trimethyl phosphate, triethyl phosphate, hexamethylphosphoramide, and their derivatives. Examples of borates include trimethyl borate, triethyl borate, and their derivatives. Examples of sulfates include trimethyl sulfate, triethyl sulfate, and their derivatives. Examples of sulfites include ethylene sulfite and its derivatives.

Examples of cyclic sulfones include sulfolane and its derivatives. Examples of linear sulfones include alkyl sulfones and their derivatives. Examples of nitriles include acetonitrile, valeronitrile, propionitrile, trimethylacetonitrile, cyclopentanecarbonitrile, adiponitrile, pimelonitrile, and their derivatives. Examples of sultones include 1,3-propane sultone and its derivatives.

The solvent may be only one of these substances, or two or more may be used in combination.

Examples of magnesium salts include $MgBr_2$, $MgI_2$, $MgCl_2$, $Mg(AsF_6)_2$, $Mg(ClO_4)_2$, $Mg(PF_6)_2$, $Mg(BF_4)_2$, $Mg(CF_3SO_3)_2$, $Mg[N(CF_3SO_2)_2]_2$, $Mg(SbF_6)_2$, $Mg(SiF_6)_2$, $Mg[C(CF_3SO_2)_3]_2$, $Mg[N(FSO_2)_2]_2$, $Mg[N(C_2F_5SO_2)_2]_2$, $MgB_{10}Cl_{10}$, $MgB_{12}Cl_{12}$, $Mg[B(C_6F_5)_4]_2$, $Mg[B(C_6H_5)_4]_2$, $Mg[N(SO_2CF_2CF_3)_2]_2$, $Mg[BF_3C_2F_5]_2$, and $Mg[PF_3(CF_2CF_3)_3]_2$. The magnesium salt may be only one of these substances, or two or more may be used in combination.

Alternatively, the electrolyte may be a solid electrolyte. In this case, examples of solid electrolytes include: $Mg_{2-1.5x}Al_xSiO_4$, where $0.1 \leq x \leq 1$; $Mg_{2-1.5x-0.5y}Al_{x-y}Zn_ySiO_4$, where $0.5 \leq x \leq 1$, $0.5 \leq y \leq 0.9$, $x-y \geq 0$, and $x+y \leq 1$; $MgZr_4(PO_4)_6$; $MgMPO_4$, where M is at least one selected from Zr, Nb, and Hf; $Mg_{1-x}A_xM(M'O_4)_3$, where A is at least one selected from Ca, Sr, Ba, and Ra, M is at least one selected from Zr and Hf, M' is at least one selected from W and Mo, and $0 \leq x < 1$; and $Mg(BH_4)(NH_2)$.

4. Experimental Results

4-1. Preparation of Cathode Active Materials

Kinds of samples were prepared by the procedure described below.

First, MgO and MnO powders were prepared as raw materials and weighed out to a molar ratio of MgO/MnO=1.3/0.7. The raw materials were then put into a 45-cc zirconia container with an appropriate amount of 3-mm zirconia balls, and this container was tightly sealed in an argon glove box. The container was removed from the argon glove box and processed in a planetary ball mill at 600 rpm for 30 hours. In this way, sample 1 of cathode active material was obtained.

Sample 2 of cathode active material was prepared in the same way as sample 1 except that MgO/MnO=1.2/0.8.

Sample 3 of cathode active material was prepared in the same way as sample 1 except that MgO/MnO=1.1/0.9.

Sample 4 of cathode active material was prepared in the same way as sample 1 except that MgO/MnO=1.0/1.0.

Sample 5 of cathode active material was prepared in the same way as sample 1 except that a CoO powder was used instead of the MnO powder with MgO/CoO=1.3/0.7.

Sample 6 of cathode active material was prepared in the same way as sample 1 except that a CoO powder was used instead of the MnO powder with MgO/CoO=1.0/1.0.

Samples 1 to 3 and 5 correspond to examples of cathode active materials according to this embodiment, whereas samples 4 and 6 correspond to comparative examples of cathode active materials.

4-2. Powder X-Ray Diffraction

Samples 1 to 6 were subjected to powder x-ray diffraction.

Figure 2:
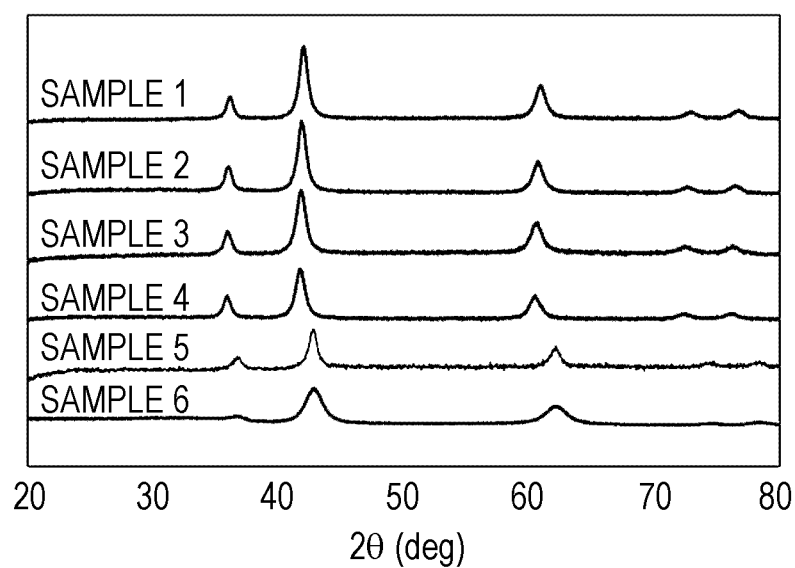
FIG. 2 illustrates powder X-ray diffraction charts from samples 1 to 6 of cathode active materials.

FIG. 2 illustrates powder x-ray diffraction charts for samples 1 to 6. The pattern revealed that for all of samples 1 to 6, the crystal structure belonged to the space group Fm-3m.

4-3. Fabrication of Batteries

Batteries were fabricated using samples 1 to 6 of cathode active materials. The entire process of the fabrication of the batteries was performed in an argon glove box.

First, 70 parts by mass of sample 1 of cathode active material, 20 parts by mass of acetylene black, and 10 parts by mass of polytetrafluoroethylene (PTFE) were weighed out. The cathode active material and acetylene black were mixed in a mortar to homogeneity, and the resulting mixture was mixed again in the mortar, with the PTFE added this time, giving a cathode mixture.

This cathode mixture was rolled to 30 μm using a roller press, yielding a cathode mixture sheet. A 5 mm×5 mm square was punched out of this cathode mixture sheet and pressure-bonded to an end of a 5 mm×30 mm Pt mesh to complete a cathode.

A 5 mm×40 mm strip was cut out of a 300-μm magnesium ribbon, its surface ground to remove the covering oxide, and the ground surface washed with acetone to complete an anode.

Magnesium bis(trifluoromethanesulfonyl)imide (Mg(TFSI)$_2$; Mg[N(CF$_3$SO$_2$)$_2$]$_2$) was dissolved in triethylene glycol dimethyl ether (triglyme), a nonaqueous solvent, to a concentration of 0.3 mol/liter, giving a nonaqueous liquid electrolyte.

Four milliliters of the nonaqueous liquid electrolyte was put into a glass beaker, and the cathode and anode were placed to complete a battery. In this way, a battery using sample 1 of cathode active material was obtained.

Batteries using samples 2 to 6 of cathode active materials were fabricated likewise.

4-4. Measuring Discharge Capacity of the Batteries

For each of the batteries made with samples 1 to 6 of cathode active materials, its discharge capacity was measured.

First, the battery was charged until a voltage of 3.3 V with the cathode current density set to 0.05 mA/cm$^2$. Then, the battery was discharged at a current density of 0.05 mA/cm$^2$ with the end-of-discharge voltage set to 0.3 V.

The table shows the relationship between the cathode active material's composition and the battery's initial discharge capacity for the batteries made with samples 1 to 6 of cathode active materials. In the table, "E" means that the sample is an example of this embodiment, whereas "CE" that the sample is a comparative example.

TABLE

|  | Composition of cathode active material | Initial discharge capacity (mAh/g) | Category |
|---|---|---|---|
| Sample 1 | Mg$_{1.3}$Mn$_{0.7}$O$_2$ | 93.2 | E |
| Sample 2 | Mg$_{1.2}$Mn$_{0.8}$O$_2$ | 81.5 | E |
| Sample 3 | Mg$_{1.1}$Mn$_{0.9}$O$_2$ | 72.2 | E |
| Sample 4 | MgMnO$_2$ | 55.2 | CE |
| Sample 5 | Mg$_{1.3}$Co$_{0.7}$O$_2$ | 36.9 | E |
| Sample 6 | MgCoO$_2$ | 20.3 | CE |

As shown in the table, the batteries made with samples 1 to 3, which satisfied Mg/Mn>1.0, achieved a great initial discharge capacity compared with that made with sample 4, for which Mg/Mn=1.0. Likewise, the battery made with sample 5, which satisfied Mg/Co>1.0, achieved a great initial discharge capacity compared with that made with sample 6, for which Mg/Co=1.0.

As described in "[1. Cathode Active Material]," this improvement in discharge capacity presumably owes to percolative conduction as a result of more magnesium than in the stoichiometric composition. Even if the composite oxide were changed to one of Mg with transition metal(s) M other than Mn and Co, therefore, the same advantage would be obtained. The range of compositions specified in "[1. Cathode Active Material]," moreover, is the range of values Mg-excess halite-structured composite oxides can theoretically have. Any composite oxide whose composition meets the specified conditions would therefore provide the same advantage.

What is claimed is:
1. A cathode active material for a magnesium secondary battery, the cathode active material comprising
   a composite oxide represented by a formula Mg$_x$M$_y$O2, where M is at least one selected from the group consisting of Ni, Co, Mn, Ti, V, Cr, Fe, Cu, and Mo; 1.0<x≤1.71, and 0.29≤y<1.0.
2. The cathode active material according to claim 1, wherein 1.0<x≤1.3, and 0.7≤y<1.0.
3. The cathode active material according to claim 1, wherein M is at least one selected from the group consisting of Ni, Co, Mn, Ti, V, Cr, Fe, and Cu.

4. The cathode active material according to claim 1, wherein M is at least one selected from the group consisting of Co and Mn.

5. The cathode active material according to claim 1, wherein M comprises Mn.

6. The cathode active material according to claim 1, wherein x+y=2, and the composite oxide has a crystal structure that belongs to space group FM-3M.

7. The cathode active material according to claim 1, wherein the cathode active material is further mixed with at least one of a binder or a conductor.

8. A magnesium secondary battery comprising:
a cathode containing the cathode active material according to claim 1;
an anode;
and an electrolyte that conducts magnesium ions, wherein the composite oxide in the cathode active material has a composition represented by the formula when the battery is completely discharged.

9. The magnesium secondary battery according to claim 8, wherein the anode contains metallic magnesium or a magnesium-containing alloy.

10. The magnesium secondary battery according to claim 8, wherein the anode consists of an anode collector on which metallic magnesium is dissolved and deposited.

11. The magnesium secondary battery according to claim 8, wherein $1.0<x\leq1.3$, and $0.7\leq y<1.0$.

12. The magnesium secondary battery according to claim 8, wherein M is at least one selected from the group consisting of Ni, Co, Mn, Ti, V, Cr, Fe, and Cu.

13. The magnesium secondary battery according to claim 8, wherein M is at least one selected from the group consisting of Co and Mn.

14. The magnesium secondary battery according to claim 8, wherein M comprises Mn.

15. The magnesium secondary battery according to claim 8, wherein x+y=2, and the composite oxide has a crystal structure that belongs to space group FM-3M.

16. The magnesium secondary battery according to claim 8, wherein the cathode active material is further mixed with at least one of a binder or a conductor.

* * * * *